United States Patent
Liu et al.

(10) Patent No.: US 6,943,938 B1
(45) Date of Patent: Sep. 13, 2005

(54) TUNABLE WAVELENGTH FILTER WITH INVARIANT TRANSMISSION AND REFLECTION BEAM ANGLES

(75) Inventors: Yuqiao Liu, Sunnyvale, CA (US); Li Wang, San Jose, CA (US); Wei-Shin Tsay, Saratoga, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 630 days.

(21) Appl. No.: 10/144,596

(22) Filed: May 10, 2002

(51) Int. Cl.[7] .............................. H01S 3/00; G02B 6/42; H04J 14/02
(52) U.S. Cl. ........................ 359/337.2; 385/18; 398/82; 398/85
(58) Field of Search .................. 359/337.2; 385/18; 398/82, 85

(56) References Cited

U.S. PATENT DOCUMENTS

| | | | |
|---|---|---|---|
| 5,812,291 A * | 9/1998 | Bendelli et al. ............... | 398/85 |
| 6,748,133 B2 * | 6/2004 | Liu et al. ...................... | 385/24 |
| 6,839,517 B2 * | 1/2005 | Anigbo et al. ................ | 398/85 |
| 6,845,187 B1 * | 1/2005 | Weaver et al. ................ | 385/18 |

* cited by examiner

Primary Examiner—Mark Hellner
(74) Attorney, Agent, or Firm—Joe Zheng; C. P. Chang

(57) ABSTRACT

Improved designs of optical devices for processing optical signals with own or more specified wavelengths are disclosed. According to embodiment, a filter mirror assembly appears an "L" shape and provides a filtering function as well as a reflecting function. The filter mirror assembly is so mounted that a rotation thereof will not alter the optical path the beam positions of signals resulted from the filter mirror assembly.

25 Claims, 4 Drawing Sheets

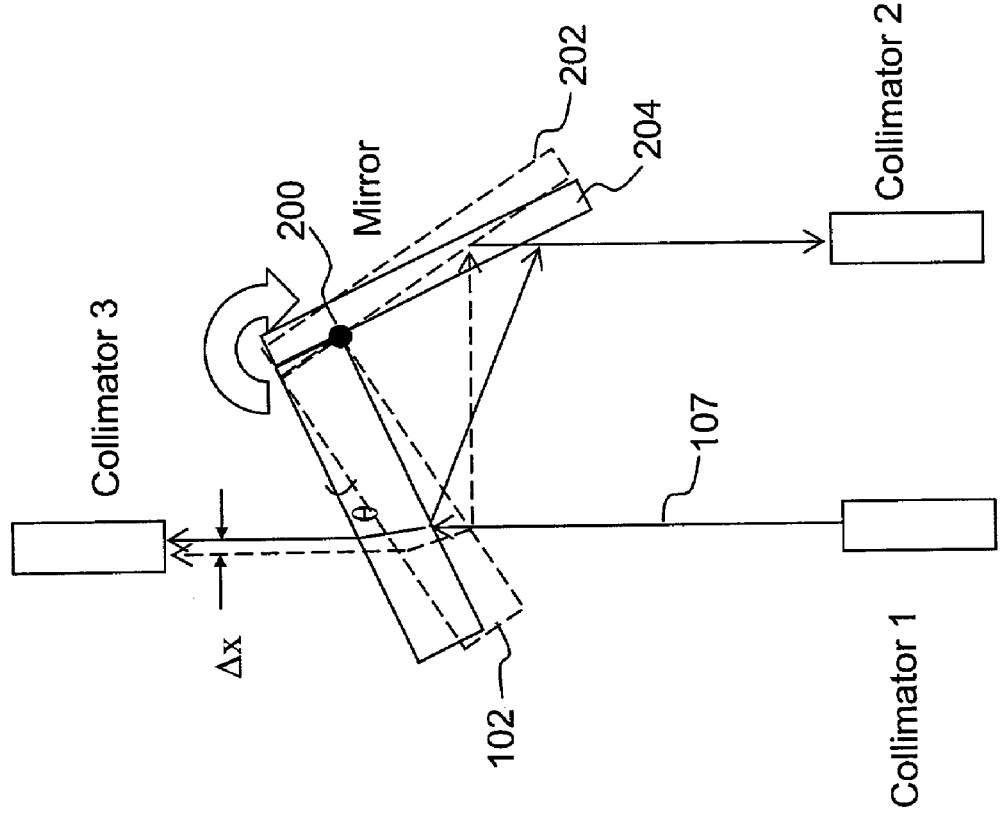

TUNABLE WAVELENGTH FILTER WITH INVARIANT TRANSMISSION AND REFLECTION BEAM ANGLES

CROSS-REFERENCE TO RELATED APPLICATION

This application is related to U.S. application Ser. No. 10/046,445, filed Oct. 29, 2001, and entitled "Method for Bonding Two Optical Parts and Apparatus thereof," which is hereby incorporated by reference.

BACKGROUND OF THE INVENTION

1. Field of the Invention

The invention is generally related to the area of optical communications. In particular, the invention is related to a method and apparatus for processing optical channel or channel band signals with specified wavelengths.

2. The Background of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths or channels in a single fiber to transmit in parallel different communication protocols and bit rates. Transmitting several channels in a single optical fiber at different wavelengths can multi-fold expand the transmission capacity of the existing optical transmission systems, and facilitating many functions in optical networking.

There are many optical parts/devices used in the optical fiber communication networks. Optical tunable filter is one of the optical parts/devices widely used in many important fiber optical applications, such as, optical add/drop modules, optical cross connect systems and tunable receivers. An ideal filter is a device which can isolate an arbitrary spectral band with an arbitrary center wavelength over a broad spectral range. Accordingly, a tunable filter is known or desired to be able to transmit at any given wavelengths with some minor turning adjustments.

There are many ways of making a filter with tuning capability and, consequently, many types of tunable filters. These include those using fiber Bragg grating and tunable acoustical filter (TAOF), traditional interferometers such as Fabry-Perot, and liquid crystal filters. All have advantages and limitations and are ended up with a trade-off among the technical feasibility, the performance demands and costs. It is desirable to have tunable filters that have the advantages of simple structure, good performance, high reliability and low cost.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to designs of optical devices and methods for processing optical channel or channel band signals with arbitrarily specified wavelengths over a predefined spectral range. According to one aspect of the present invention, an optical filter, such as a thin film filter with a bandpass WDM filter coating on one side and an antireflection (AR) coating on the other side, both sides being substantially parallel with each other, is integrated with a high-reflective (HR) mirror. Specifically, the optical filter and the mirror are integrated in such a way that one side (e.g., the WDM filter coating) of the optical filter and the reflecting side of the mirror is perpendicular to each other, and such thus forming a right angle between the two surfaces. The integrated part is then so mounted that it can be rotated around a rotation axis positioned at the apex of the right angle, or which is the same an intersection of the WDM filter coating side of the optical filter and the reflecting side of the mirror. In general, the optical filter has a frequency response of a bandpass filter and the center bandpass frequency depends on an incident angle at which an incoming optical signal impinges upon the WDM filter coating side of the optical filter. As a result, the beam angles of the transmitted signal as well as the reflected optical signal are invariant to the rotation of the optical filter mirror assembly around said axis, and thus invariant to the incident angle of the incoming signal to the optical filter. By positioning the rotation axis at the intersection, not only the beam angle but the total position of the reflected beam will be invariant to the rotation of the filter-mirror assembly. Therefore, a wide range of wavelengths can be selected to transmit through the optical filter, and keep the reflected signal uninterrupted.

There are numerous benefits, features, and advantages in the present invention. One of them is a simple structure, good performance, high reliability and low cost in the tunable filters contemplated in the present invention.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2 shows that the integrated optical filter and the mirror have been rotated around a rotation axis from one position to another position;

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1–4B. However, those skilled in the art will readily appreciate that the detailed description given herein with respect to these figures is for explanatory purposes as the invention extends beyond these limited embodiments.

Figure 1:
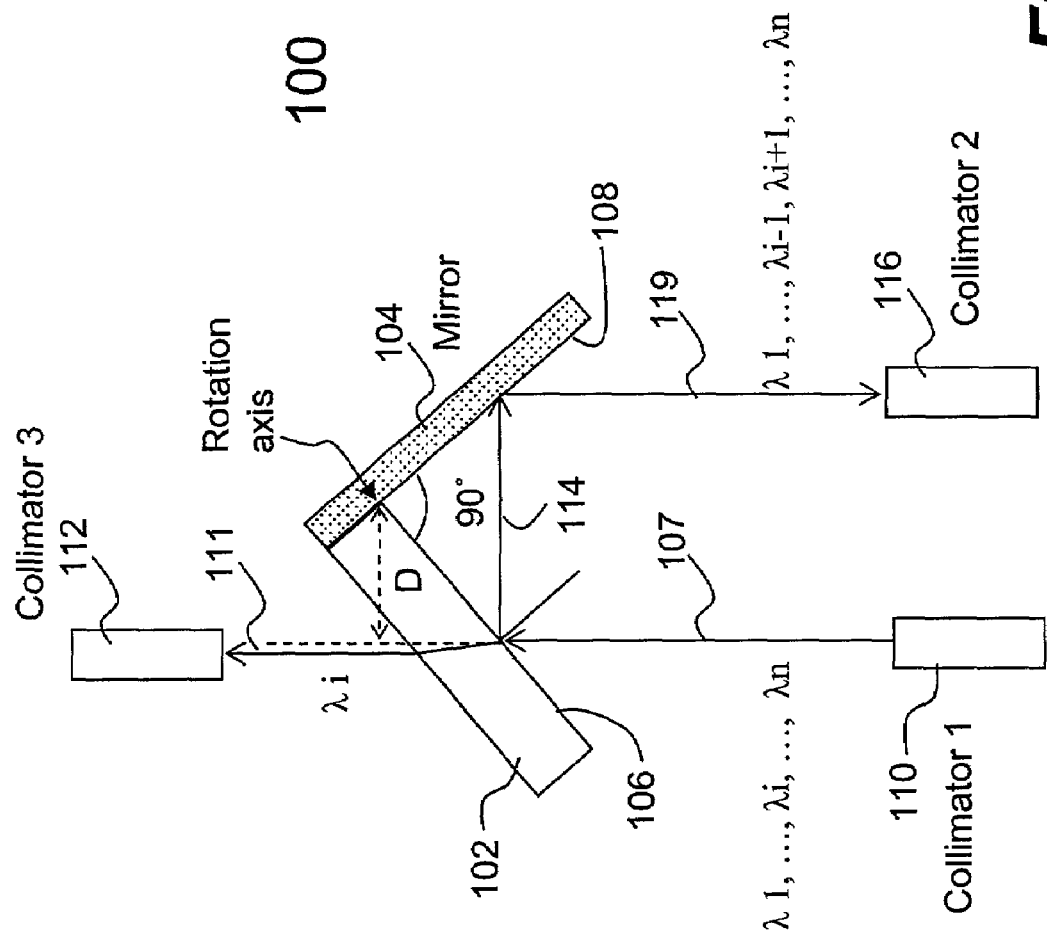
FIG. 1 shows an optical device including an optical filter integrated with a mirror and three respective collimators according to one embodiment of the invention.

FIG. 1 shows an optical device 100 according to one embodiment of the invention. In particular, the optical device 100 is capable of maintaining beam direction and angle of both transmission beam and reflection beam while rotating a filter mirror assembly 101 relatively to an incoming optical beam or signal (e.g., a multiplexed signal) with a plurality of wavelengths. As shown in the figure, the optical device 100 includes the filter mirror assembly 101 that appears an "L" shape and provides a filtering function as well as a reflecting function. According to one embodiment, the filter mirror assembly 101 includes an optical filter 102 and a mirror 104. The optical filter 102 is so chosen that the frequency response thereof to an incoming signal depends on an incident angle of the incoming signal coming to its incident side 106. The mirror is preferably of high reflection. According to another embodiment, the filter mirror assembly 101 includes a thin film filter that is substantially "L" shaped. In other words, one side of the thin film filter retains the filtering function and the other side of the thin film filter is coated with a high-reflection material to function as a mirror. Given the description herein, those skilled in the art may appreciate that there are alternative embodiments of the filter mirror assembly 101 that provides the similar functions contemplated in the present invention.

In general, the optical filter 102 has two sides, preferably, a bandpass WDM filter coating on one side and an antireflection (AR) coating on the other side with both side substantially parallel with each other. Depending on the use of the optical device 100, either side can be an incident side to receive an optical signal. To facilitate the description of the present invention, it is assumed that the optical device 100 is used to drop or filter out a specific wavelength from an incoming multiplexed signal 107 as shown in FIG. 1. According to one embodiment of the present invention, the optical filter 102 is integrated with the mirror 104 in such a way that the incident side 106 of the optical filter 102 is perpendicular to the reflecting surface 108 of the mirror 104. In operation, the incoming signal 107, assumed to have wavelengths $\lambda_1, \lambda_2, \ldots,$ and $\lambda_N$, is coupled from a collimator 110 to the optical filter 102. According to a particular requirement, for example, only a signal with wavelength $\lambda_j (1 \leq j \leq N)$ is to be transmitted through the optical filter 102 positioned at a particular position, for example, P1, at the same time, the remaining wavelengths in the signal 107 (i.e., the reflected signal 114) are reflected to the mirror 104 that further reflects the reflected signal 114 to a collimator 116.

As a result, the collimator 110 couples in the incoming signal 107 with wavelengths $\lambda_1, \lambda_2, \ldots,$ and $\lambda_N$, the collimator 112 outputs a transmitted signal 111 at a selected wavelength $\lambda_j$ and the collimator 116 outputs the reflected signal 114 with all wavelengths except for $\lambda_j$.

When there is a need to alter the selection of the transmitted wavelength $\lambda_j$ to $\lambda_i$, wherein $1 \leq i, j \leq N$ and $i \neq j$, the integrated optical filter 102 and the mirror 104 can be rotated accordingly to a new position, for example, P2. Referring now to FIG. 2, it shows that the integrated optical filter 102 and the mirror 104 have been rotated around the rotation axis 200 from a position P1 202 to a new position P2, 204. Because the incident angle of the signal 107 is changed, only a signal with wavelength $\lambda_i$ is transmitted through the optical filter 102 positioned at the present position, at the same time, the remaining wavelengths in the signal 108 are reflected to the mirror 104 that further reflects the reflected signal 114 to the collimator 116.

It can be readily appreciated that the above description equally applied to the applications in which a signal at a specific wavelength (e.g., $\lambda_j$) is to be combined with an incoming signal by reversing the optical paths. A resultant newly combined or multiplexed signal will be output from collimator 110 via the mirror.

One of the features in the present invention is that the reflected signal always maintains the same beam position regardless how the incident angle to the optical filter 102 is changed, as long as the rotation of the filter mirror assembly is around the rotation axis 200 which is located at the intersection of the mirror and filter coating surfaces. Another one of the features in the present invention is that the transmitted beam's angle is also independent of the filter mirror assembly rotation when the two sides of the filter to be substantially parallel with each other.

Figure 3A:
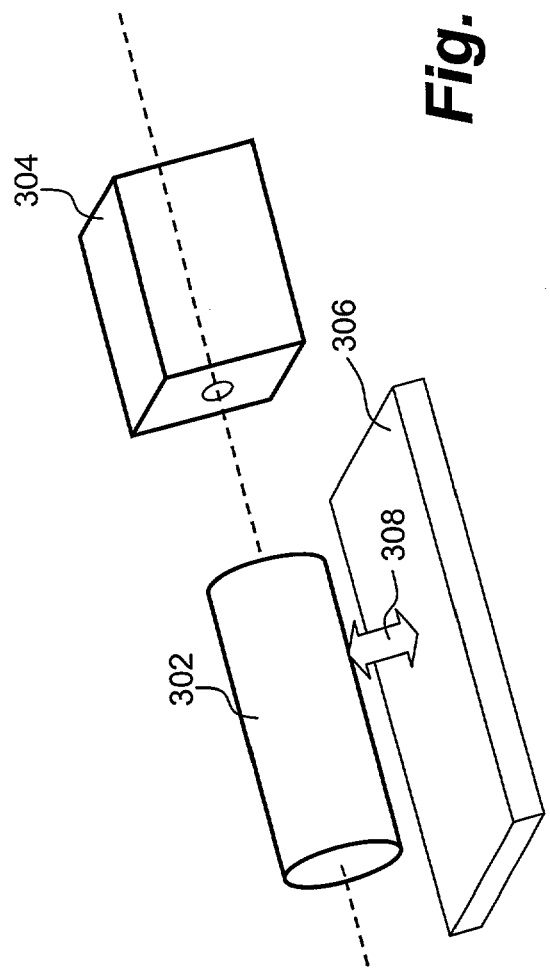
FIG. 3A shows a setting in which two optical parts (e.g. a collimator and an optical filter or a mirror) are being aligned before they are permanently bonded to a substrate to preserve an aligned optical path therebetween.

To ensure a precise alignment between two or more optical elements, according to another embodiment, at least one of the three collimators 110, 112 and 116 are bonded to a substrate after it is aligned with a counter part. FIG. 3A shows a setting 300 in which two optical parts (e.g. a collimator and an optical or mirror) 302 and 304 are being aligned before the optical part 302 is permanently bonded to a substrate 306 to constitute a whole device or an integrated part of a device. In one exemplary alignment procedure, the optical part 302 is elevated a small distance 308 (i.e. gaps) from the substrate 306 so that adjustment of the optical part 302 can be performed with respect to the optical part or device 304. Once the alignment of the two optical parts is done, the prior art method is to apply a kind of bonding agent, such as epoxy, to fill in the gaps between the aligned optical part and the substrate. Another prior art method is to fill in the gaps between the aligned optical part and the substrate with solder (or alloy), as a result, a single optical part or an integrated part of an optical device is formed.

In reality, however, it has been noticed that the filling material, either the bonding agent or the solder, can shrink when it is dried out or cool down, resulting in an undesirable alternation or disturbance to the positions of the originally aligned optical parts. According to one aspect of the present invention, the gaps illustrated in FIG. 3A is not to be filled with any agent, instead, two or more preformed wedges are used to hold up the originally aligned optical parts when a boding agent is applied. To bond the optical parts to the wedges, a small amount of a bonding agent (e.g. epoxy) is used but only applied to respective contacts between the optical parts and the wedges. Because the amount of the bonding agent is small and the wedges primarily position the optical parts, the alignment of the optical parts is preserved. In fact, the use of the wedges can sustain the alignment under very high environmental stresses (e.g. varying temperatures and vibrations).

Figure 3B:
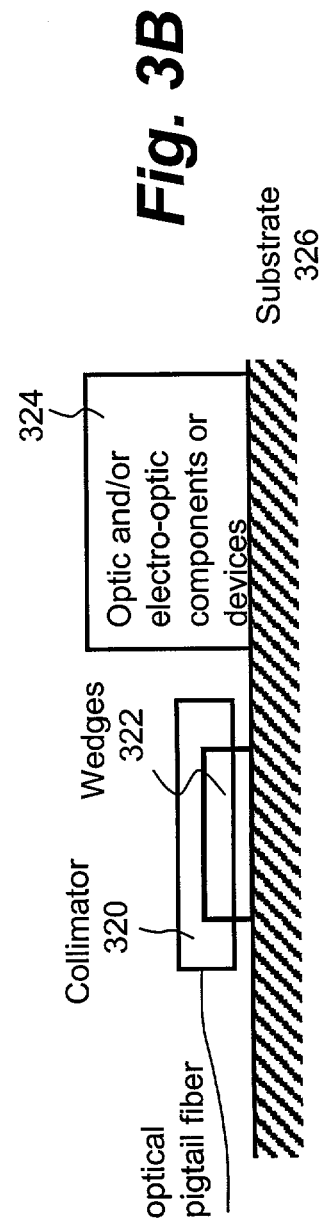
FIG. 3B shows that a collimator is being positioned by wedges after it is aligned with an optical component or device.

FIG. 3B shows that a collimator 320 is being positioned by wedges 322 after the collimator 320 has been aligned with an optical component or device 324 (collectively to represent one or more optical parts/devices). The gaps between the collimator 320 and the substrate 326 are created for aligning the collimator 320 with the device 324. As shown in the figure, the wedges 322 are used to fill in the gaps and at the same time to hold up the positions of the collimator 320 to maintain the alignment.

Figure 4B:
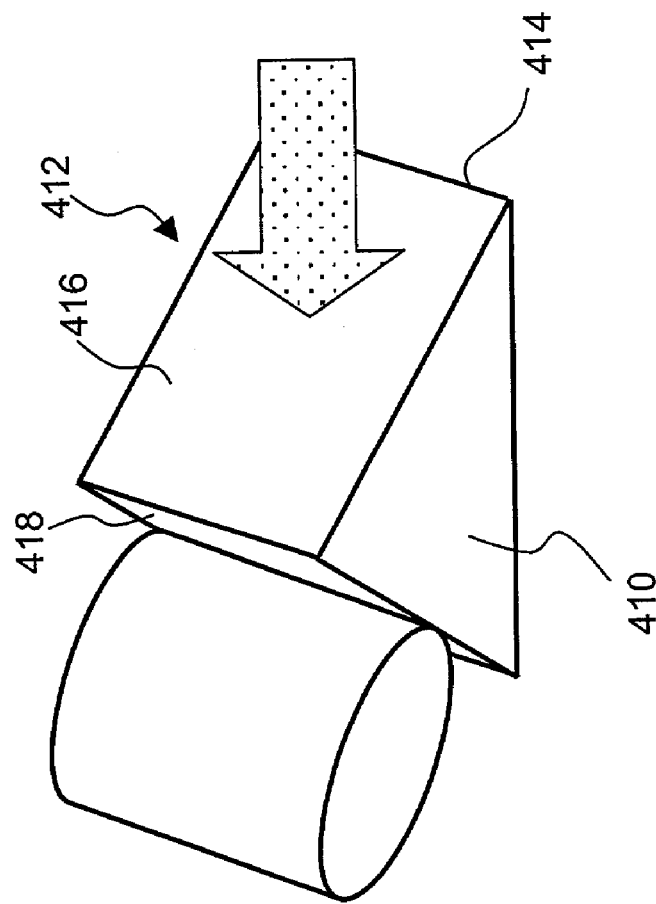
FIG. 4B illustrates a wedge having a cross-section being right triangular and being slid towards a cylindrical optical part.
Figure 4A:
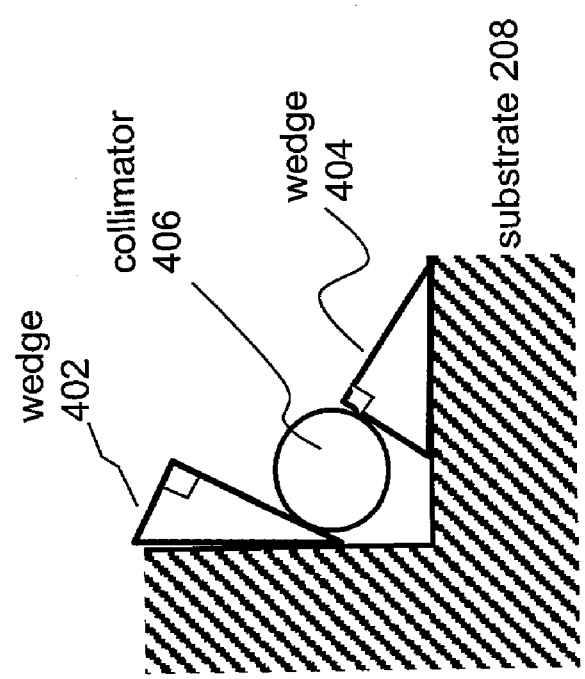
FIG. 4A shows a cross-section view of an optical part being positioned by two wedges and bonded to a substrate.

Referring now to FIG. 4A, there is shown a cross-section view of an optical part 406 being positioned by two wedges 402 and 404 and bonded to a substrate 408. In an exemplary operation, the optical part 406 (e.g. a collimator) is first aligned with another optical part (not shown). To perform the alignment, one or both of the optical parts are slightly positioned away from the substrate 408 so that one or both of the optical parts can be adjusted appropriately to ensure that both of the optical parts are aligned with each other. Once the alignment is done, the positions of the optical parts shall be preserved. The two wedges 402 and 404 are respectively slid in from two different directions to hold up the positions of the optical parts when a boding agent is applied. According to one embodiment, a small amount of a bonding agent is applied to only the respective contacts between the contacting surfaces of the optical parts and the wedges. The wedges are then fastened to the substrate by a bonding means (e.g. adhesive, solder, or mechanic fixing).

According to one embodiment, the cross section 410 of the wedge 412 is shaped as a right triangle, shown in FIG. 4B. The wedge can be slid in with the sliding face (formed by the hypotenuse of the right triangle) downward to avoid possible flipping over or up the already aligned optical parts. Other details of the bonding and/or aligning the respective collimators with the optical filter as well as the mirror can be found in co-pending U.S. application Ser. No. 10/046,445, entitled "Method for Bonding Two Optical Parts and Apparatus thereof".

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim:

1. An optical device comprising:
    an optical filter having an incident side, a frequency response of the optical filter to an incoming signal depending on an incident angle of the incoming signal to the incident side; and
    a mirror having a reflecting side and integrated with the optical filter to form an integrated part rotatably mounted on a rotation axis, the mirror and the optical filter being integrated in such a way that the incident side of the optical filter is perpendicular to the reflecting side of the mirror, wherein a rotation of the integrated part changes the frequency response of the optical filter.

2. The optical device as recited in claim 1 wherein the frequency response is bandpass centered at a wavelength in accordance with the incident angle.

3. The optical device as recited in claim 1 wherein the optical filter is a thin film filter.

4. The optical device as recited in claim 1 wherein the optical filter is bonded with the mirror to be rotatable around the rotation axis to accommodate a selection of a particular wavelength in the incoming signal to be transmitted through the optical filter.

5. The optical device as recited in claim 4 wherein the rest of wavelengths in the incoming signal is reflected to the mirror.

6. The optical device as recited in claim 1 wherein an rotation of the integrated part does not change respective optical paths for receiving the incoming signal and outputting a reflected signal from the mirror.

7. The optical device as recited in claim 6, wherein the incoming signal has N respective wavelengths $\lambda_1 \lambda_2 \ldots \lambda_N$ and the reflected signal have N−1 respective wavelengths.

8. The optical device as recited in claim 1 further comprising:
    a first collimator receiving the incoming signal that has N respective wavelengths $\lambda_1 \lambda_2 \ldots \lambda_N$ and coupling the incoming signal onto the optical filter that transmits a signal having a wavelength $\lambda_i$ out of the wavelengths $\lambda_1 \lambda_2 \ldots \lambda_N$ through and reflects the rest of the wavelengths to the mirror;
    a second collimator receiving the transmitted signal from the optical filter; and
    a third collimator receiving a reflected signal having the rest of the wavelengths from the mirror.

9. The optical device as recited in claim 8, wherein each of the first, second and third collimators is firmly positioned by two wedges respectively to hold up positions of the each of the first, second and third collimators.

10. The optical device as recited in claim 9 further comprising a substrate supporting the two wedges by bonding the two wedges thereto.

11. An optical device comprising:
    an optical filter having an incident side, a frequency response of the optical filter to an incoming signal depending on an incident angle of the incoming signal to the incident side;
    a first collimator coupling the incoming signal to the optical filter;
    a mirror having a reflecting side and integrated with the optical filter in such a way that the incident side of the optical filter is perpendicular to the reflecting side of the mirror, the mirror receiving a reflected signal from the mirror after a transmitted signal goes through the optical filter, wherein the reflected signal is the rest of the incoming signal;
    a second collimator receiving the transmitted signal from the optical filter; and
    a third collimator receiving the reflected signal from the mirror.

12. The optical device as recited in claim 11, wherein the incoming signal has N respective wavelengths $\lambda_1 \lambda_2 \ldots \lambda_N$, the transmitted has a wavelength $\lambda_j$ that is one of the wavelengths $\lambda_1 \lambda_2 \ldots \lambda_N$, and the reflected signal has all of the wavelengths $\lambda_1 \lambda_2 \ldots \lambda_N$ except for the wavelength $\lambda_j$.

13. The optical device as recited in claim 11, wherein the optical filter is bonded with the mirror to be rotatable around a rotation axis to accommodate a selection of a particular wavelength in the incoming signal to be transmitted through the optical filter.

14. The optical device as recited in claim 13, wherein the rotation axis is positioned at an intersection of the incident side of the optical filter and the reflecting side of the mirror.

15. The optical device as recited in claim 11, wherein a first optical path between the first collimator and the optical filter and a second optical path between the third collimator and the mirror remain intact when the optical filter and the mirror rotates around a rotation axis at an intersection of the incident side of the optical filter and the reflecting side of the mirror.

16. The optical device as recited in claim 15, wherein each of the first, second and third collimators is firmly positioned by two wedges respectively to hold up positions of the each of the first, second and third collimators.

17. The optical device as recited in claim 16 further comprising a substrate supporting the two wedges by bonding the two wedges thereto.

18. The optical device as recited in claim 17, wherein each of the two wedges has a cross-section shaped substantially like a right triangle.

19. An optical device comprising:

a filter mirror assembly including a first part and a second part, the first part being an optical filter having a first side, a frequency response of thereof to an incoming signal depending on an incident angle of the incoming signal to the first side; the second part being a mirror having a second side, wherein the first side and the second side are perpendicular to each other to form a right angle;

wherein the filter mirror assembly is mounted in such a way that the filter mirror assembly can rotate around an apex of the right angle so that beam positions of a selected signal from the first part and a reflected signal from the second part are invariant to an rotation of the filter mirror assembly.

20. The optical device as recited in claim 19, wherein the incoming signal including wavelengths $\lambda_1, \lambda_2, \ldots \lambda_N$ is coupled to the optical filter from a first collimator and the selected signal including a wavelength $\lambda_j$ is coupled out from the optical filter or coupled in to the optical filter from a second collimator.

21. The optical device as recited in claim 20, wherein the reflected signal including wavelengths $\lambda_1, \lambda_2, \ldots \lambda_N$ that does not include the wavelength $\lambda_j$ is coupled out from a third collimator.

22. The optical device as recited in claim 20, wherein the reflected signal including wavelengths $\lambda_1, \lambda_2, \ldots \lambda_N$ that does include the wavelength $\lambda_j$ is coupled out from a third collimator.

23. The optical device as recited in claim 20, wherein each of the first, second and third collimators is firmly positioned by two wedges respectively to hold up positions of the each of the first, second and third collimators.

24. The optical device as recited in claim 23 further comprising a substrate supporting the two wedges by bonding the two wedges thereto.

25. The optical device as recited in claim 24, wherein each of the two wedges has a cross-section shaped substantially like a right triangle.

* * * * *